United States Patent [19]

Carlton et al.

[11] Patent Number: 5,135,708
[45] Date of Patent: Aug. 4, 1992

[54] METHOD OF INJECTION TO OR NEAR CORE INLET

[75] Inventors: James D. Carlton, Lynchburg; Larry D. Dixon; Edward R. Kane, both of Forest, all of Va.

[73] Assignee: B&W Nuclear Service Company, Lynchburg, Va.

[21] Appl. No.: 773,801

[22] Filed: Oct. 9, 1991

[51] Int. Cl.$^5$ .............................................. G21C 15/18
[52] U.S. Cl. ...................................... 376/282; 376/292
[58] Field of Search ................ 376/282, 292, 352, 302

[56] References Cited

U.S. PATENT DOCUMENTS

| | | |
|---|---|---|
| 3,713,969 | 1/1973 | Cahill, Jr. ............................. 376/281 |
| 4,187,147 | 2/1980 | Braun et al. ........................ 376/282 |
| 4,576,778 | 3/1986 | Ferree et al. ....................... 376/203 |
| 5,000,907 | 3/1991 | Chevereau et al. ................ 376/282 |

Primary Examiner—Daniel D. Wasil
Attorney, Agent, or Firm—Robert J. Edwards; Michael L. Hoelter

[57] ABSTRACT

In order to supply emergency coolant directly to the core inlet of a nuclear reactor, a separate and distinct channel is located within the reactor vessel. This channel flows downward along the perimeter of the core barrel and discharges its emergency coolant directly to the core inlet. Separate nozzles couple this channel to the supply of emergency coolant.

4 Claims, 5 Drawing Sheets

PRIOR ART

METHOD OF INJECTION TO OR NEAR CORE INLET

FIELD OF THE INVENTION

This invention pertains to a method and apparatus for supplying emergency cooling fluid the core of a nuclear reactor and more specifically, to supplying coolant to the core inlet during a Loss Of Coolant Accident (LOCA).

BACKGROUND OF THE INVENTION

In the nuclear power industry, nuclear reactors must be designed so as to withstand a variety of postulated accidents. Probably the most traumatic, if not most important, potential accident to be avoided is a loss of coolant accident (LOCA) involving the nuclear reactor. This occurs when there is a breach in the cooling system causing a drop in pressure along with a loss of coolant. As can be imagined, without any coolant in the reactor core, the core will overheat, potentially causing severe damage not only to the structure but also to the surrounding environment.

The principal method of mitigating such an accident is to flood the reactor with coolant. This must occur as soon as possible after the cooling system loses pressure in order to absorb the heat that builds up in the core during the LOCA. This usually involves adjacent storage tanks of emergency coolant that are coupled to the reactor piping. In some cases these tanks are under pressure and in others, pumps are provided to deliver the coolant to the reactor. This emergency coolant is injected into the reactor piping in any of several locations such as hot leg piping, cold leg piping, through the wall near the top of the reactor vessel, or by piping arrangements to the plenum area above the reactor core. However, one major drawback of tying into the reactor piping is the possibility that the break will prevent the fluid from reaching the reactor core.

It is thus an object of this invention to provide a means for delivering emergency coolant directly to the reactor core inlet without relying upon the reactor piping for delivery. Another object of this invention is to provide a means for delivery that will not interfere with or utilize the normal core cooling piping required for operation. A further object of this invention is to provide a means for delivering emergency coolant without it flashing or evaporating due to the high heat involved or the pressure difference encountered.

SUMMARY OF THE INVENTION

As disclosed herein, this invention pertains to a method and apparatus for supplying emergency coolant directly to the core inlet. It incorporates the steps and structure required to provide a separate and distinct channel within the nuclear reactor for receiving emergency coolant therein. It also specifies the supplying of emergency coolant to this channel thereby causing it to flow downward along the perimeter of the core barrel. Afterwards, this emergency coolant is delivered directly to the core inlet.

DETAILED DESCRIPTION OF THE DRAWINGS

Figure 1:
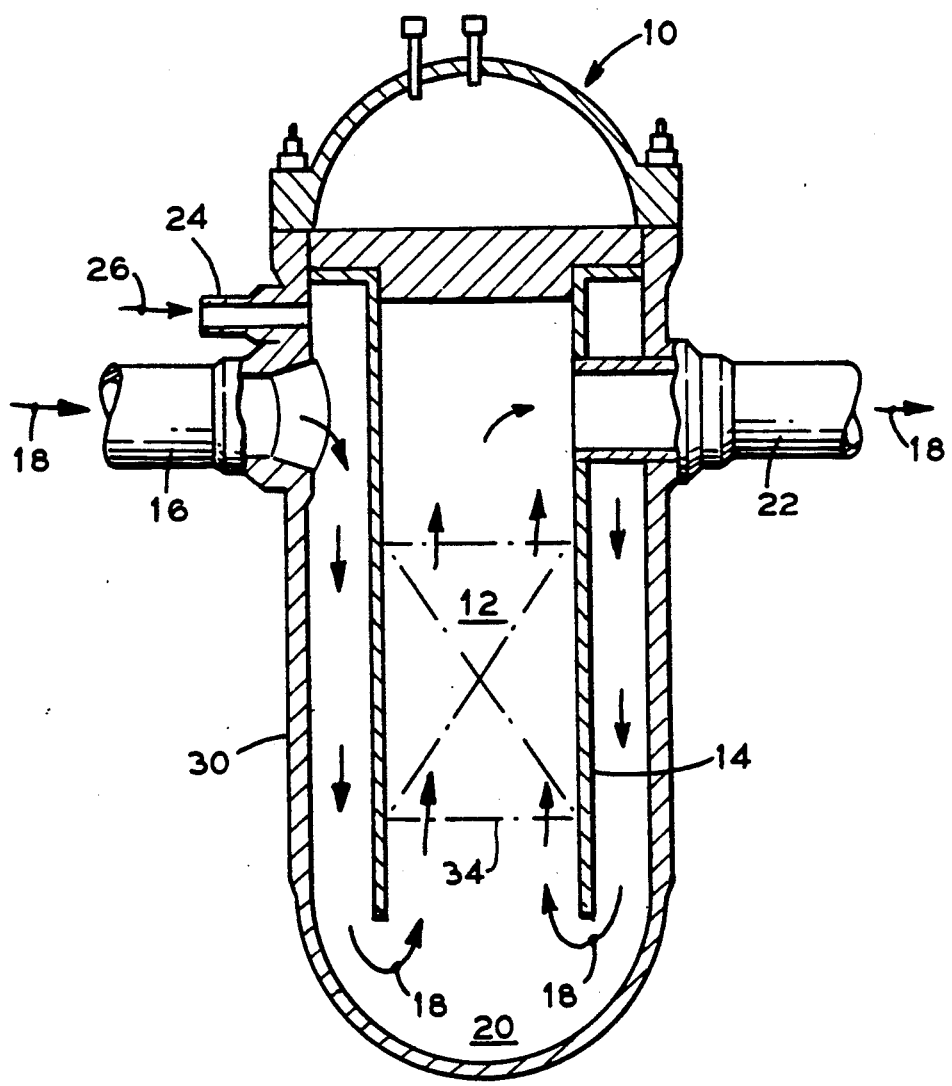
FIG. 1 is a schematic view of a typical nuclear reactor, partially broken away, illustrating its various components and flow paths.

Referring initially to FIG. 1, there is shown typical nuclear reactor vessel 10 which houses core 12 and core barrel 14. Cold leg inlet piping 16 normally delivers cooling fluid 18 to reactor 10 where it flows around the outside of core barrel 14 to lower plenum 20. This fluid 18 then flows upward through core barrel 14 to cool core 12 before flowing out hot leg exit piping 22 where the heat absorbed by fluid 18 is used elsewhere. Emergency injection nozzles 24 provide a means of supplying emergency coolant 26 to reactor 10 when the need arises.

Figure 2:
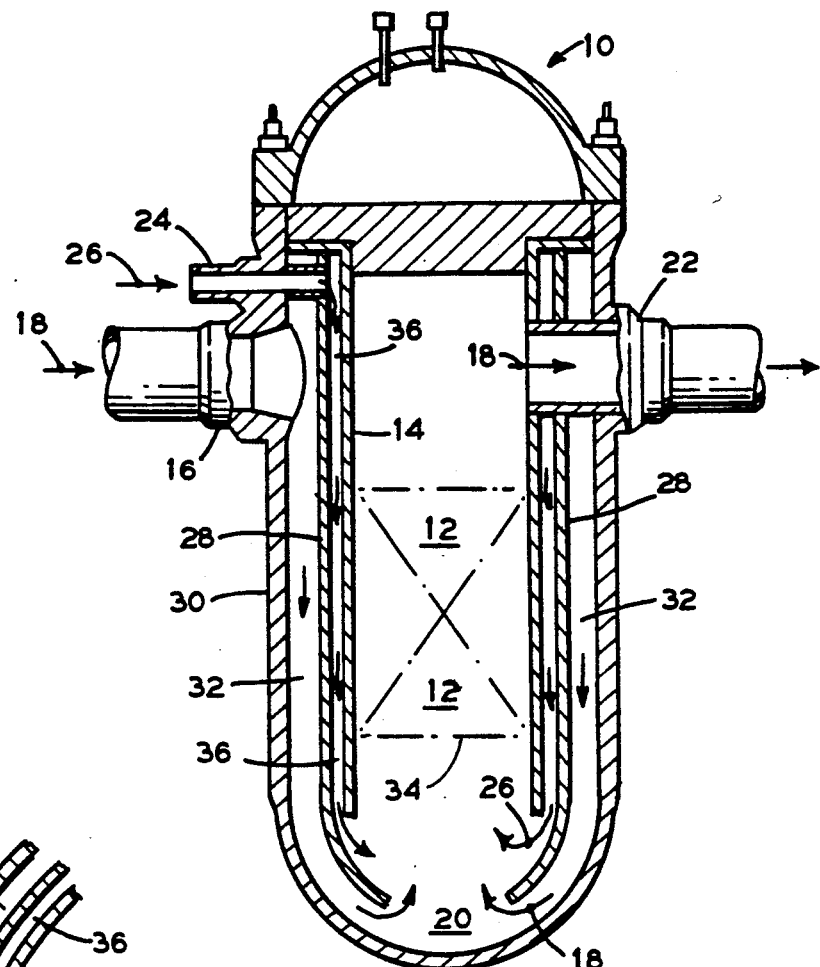
FIG. 2 is a schematic view of a nuclear reactor, partially broken away, illustrating one embodiment of this invention wherein emergency coolant is delivered to the core inlet through an annular channel surrounding the core barrel.
Figure 3:
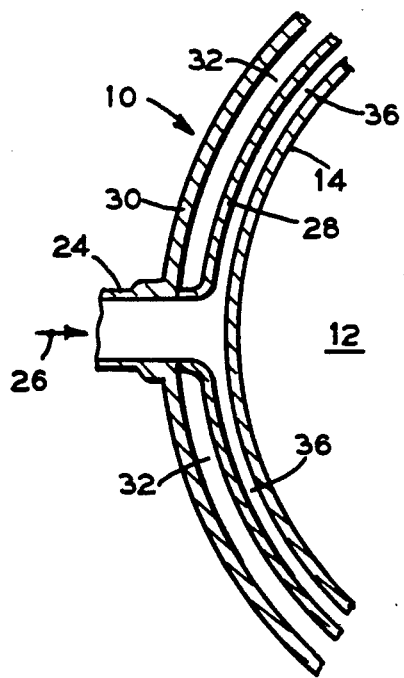
FIG. 3 is a detailed planar view, partially broken away, illustrating the injection nozzle and the annular channel of FIG. 2 in greater detail.

Referring now to FIGS. 2 and 3, in accordance with this invention, nuclear reactor 10 is fitted or constructed with circular cylinder 28 that is positioned between core barrel 14 and reactor vessel wall 30 as shown. Cylinder 28 is generally concentric with respect to core barrel 14 and divides this typical annular space within reactor 10 into two separate annular flow channels. In this fashion, normal cooling fluid 18 flows within outer channel 32 during its journey from cold leg inlet piping 16 to core inlet 34. During normal operation, cooling fluid 18 also enters inner channel 36 next to core barrel 14 as a result of pressure equalization but there is no actual flow within inner channel 36 as there is in outer channel 32.

Of course, for containment purposes, the upper region of cylinder 28 is sealed within reactor 10 and is also sealed around hot leg piping 22. The bottom or lower end of cylinder 28 is usually open as shown, but it can also be secured or attached to core barrel 14 with flow openings provided so that emergency coolant 26 can pass through these openings before entering core inlet 34.

During a loss of coolant accident (LOCA), emergency coolant 26 is supplied reactor 10 via injection nozzle 24. Preferably there would be at least four such nozzles 24 with their actual number being dependant upon the reactor design. Each nozzle 24 is generally located at an elevation above the top of core 12 and, in FIG. 2, nozzle 24 happens to also be located above both the inlet for cold leg inlet piping 16 and the exit for hot leg exit piping 22. As shown in FIG. 3, each injection nozzle 24 is in direct fluid connection with inner channel 36. Thus, in this embodiment, whenever emergency coolant 26 is supplied reactor 10, coolant 26 flows downward within inner channel 36 and along the outside of reactor core barrel 14 before reaching lower plenum 20. From plenum 20, emergency coolant 26 flows upward into and through core 12. In this fashion, core barrel 14 is cooled during a LOCA and emergency coolant 26 is supplied directly to core 12 without prior coupling to the normal coolant piping which has ruptured causing the LOCA.

Because of the rupture in the normal coolant piping, normal cooling fluid 18 has escaped as a result of the greater pressure within the cooling system. This is generally referred to as "flashing" since the heated pressurized coolant is now exposed to normal atmospheric pressure. Such "flashing" and loss of normal cooling fluid 18 can occur within a matter of seconds, thus it is important to deliver emergency coolant 26 to reactor 10 as quickly as possible to reduce any heat build-up that will occur whenever core 12 becomes uncovered. It is vitally important to supply emergency coolant 26 directly to core inlet 34 after such rapid de-pressurization so as to refill the system with sufficient additional cooling fluid. It is also the intent of emergency coolant 26 to prevent the occurrence of "flashing" from depleting the coolant already in lower plenum 20.

Emergency coolant 26 is generally supplied under pressure from either an elevated or a pressurized storage tank or a pump is utilized to develop the requisite pressure needed to deliver coolant 26 to core inlet 34.

Figure 4:
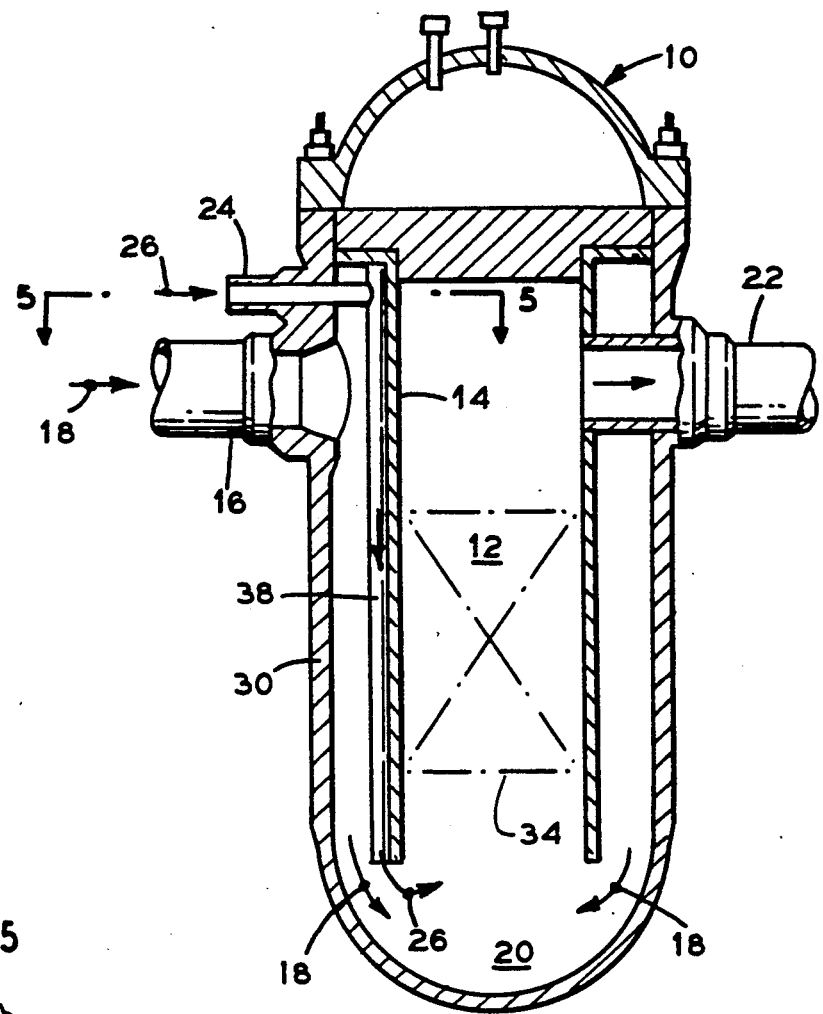
FIG. 4 is a schematic view, partially broken away, of an alternate embodiment of the invention illustrating a downcomer pipe outside the core barrel for delivering emergency coolant directly to the core inlet.
Figure 5:
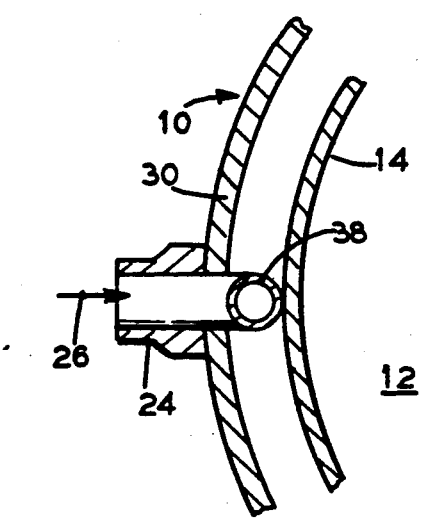
FIG. 5 is a detailed planar view, partially broken away, illustrating the location of the downcomer pipe outside the core barrel of FIG. 4 in greater detail.

Alternate embodiments of supplying emergency coolant 26 directly to core inlet 34 without prior coupling to normal reactor piping are shown in FIGS. 4 through 8. FIGS. 4 and 5 illustrate the use of downcomer pipe 38 which are located along the outside perimeter of core barrel 14. Downcomer pipes 38 are configured to substitute for inner channel 36 discussed above. As shown, downcomer pipe 38 terminates adjacent the bottom of core barrel 14 such that it discharges emergency coolant 26 directly to core inlet 34. Preferably, there would be more than one such downcomer pipe 38 in each reactor 10 with each such pipe 38 being coupled to its respective injection nozzle 24. In accordance with this embodiment, there would be no inner channel 36, thus the entire annular space between core barrel 14 and reactor wall 30 (minus the downcomer pipes 38) could be used for the flow of normal cooling fluid 18.

Figure 6:
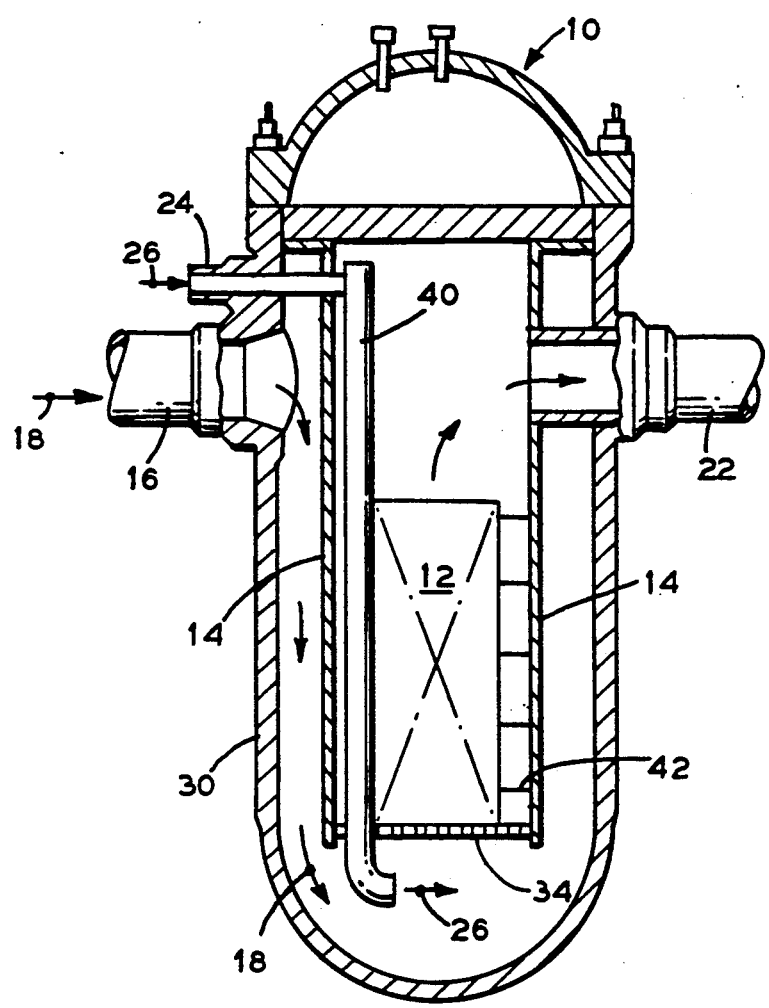
FIG. 6 is a schematic view, partially broken away, of still another alternate embodiment of the invention illustrating a downcomer pipe inside the core barrel for delivering emergency coolant directly to the core inlet.
Figure 7:
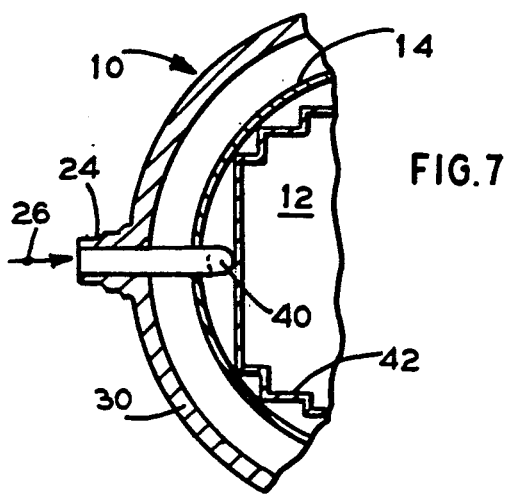
FIG. 7 is a detailed planar view, partially broken away, illustrating the location of the downcomer pipe inside the core barrel of FIG. 6 in greater detail.

Referring now to FIGS. 6 and 7, another alternate embodiment is disclosed. In accordance with this embodiment, a multitude of emergency injection pipes 40 are installed along the inside perimeter of core barrel 14. These injection pipes 40 are located between core barrel 14 and core 12 and they can substitute for downcomer pipes 38 discussed above. As shown, injection pipes 40 couple to injection nozzles 24 and pass through core barrel 14. These pipes 40 then extend downward along baffle plates 42, which are located adjacent core 12, before terminating at core inlet 34. With this embodiment, the entire annular space between core barrel 14 and vessel wall 30 could be used for the flow of normal cooling fluid 18.

Figure 8:
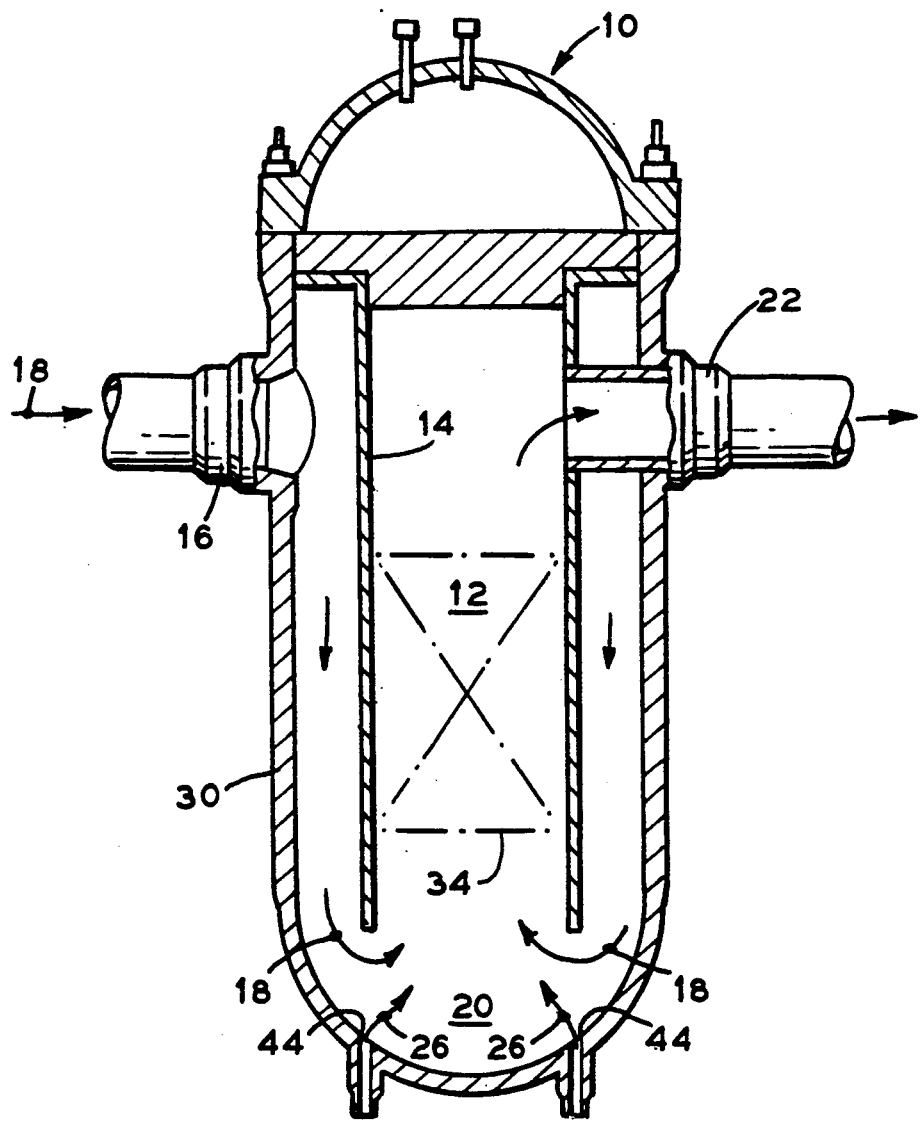
FIG. 8 is a schematic view of a nuclear reactor, partially broken away, illustrating yet another embodiment of the invention wherein the emergency coolant is injected directly into the bottom of the reactor.

FIG. 8 discloses the use of a multitude of injection nozzles 24 (preferably ten or more) that extend through the bottom of reactor 10 and exit directly into lower plenum 20. Preferably, these nozzles 24 would extend through unused instrumentation ports 44 so that emergency coolant 26 would be discharged directly to core inlet 34.

As can be seen, there are a variety of methods of supplying emergency coolant 26 directly to core inlet 34 as anticipated by this invention. These and other methods now being readily apparent.

What is claimed is:

1. A method of supplying emergency coolant directly to the core inlet of a nuclear reactor comprising the steps of:
   (a) supporting a concentric cylinder around the core barrel of the nuclear reactor in the annular space between the core barrel and the outside wall of the nuclear reactor, said cylinder having an open bottom and defining an annular channel between the core barrel and said cylinder;
   (b) coupling said channel to an emergency coolant supply line, said emergency coolant supply line being separate and distinct from the supply of normal coolant to the nuclear reactor;
   (c) supplying emergency coolant to said channel whereby emergency coolant flows downward along the outside perimeter of the core barrel; and,
   (d) delivering emergency coolant from said channel through said open bottom and directly to the core inlet.

2. The method of supplying emergency coolant as set forth in claim 1 wherein the emergency coolant supplied to said channel is supplied at an elevation above the top of the nuclear core of the nuclear reactor.

3. An apparatus for supplying emergency coolant directly to the core inlet of a nuclear reactor comprising:
   (a) a concentric cylinder around the core barrel of the nuclear reactor and supported in the annular space between the core barrel and the outside wall of the nuclear reactor, said cylinder having a bottom opening and defining an annular channel between the core barrel and said cylinder;
   (b) coupling means for coupling said channel to an emergency coolant supply line, said emergency coolant supply line being separate and distinct from the supply of normal coolant to the nuclear reactor; and,
   (c) said channel being configured to direct emergency coolant to flow downward along the outside perimeter of the core barrel afterwhich the emergency coolant is delivered through said bottom opening directly to the core inlet.

4. The apparatus as set forth in claim 3 wherein said channel is configured with an inlet at an elevation above the top of the nuclear core of the nuclear reactor.

* * * * *